Dec. 6, 1938.  V. EMANUEL  2,138,910
TOASTER
Filed April 19, 1937
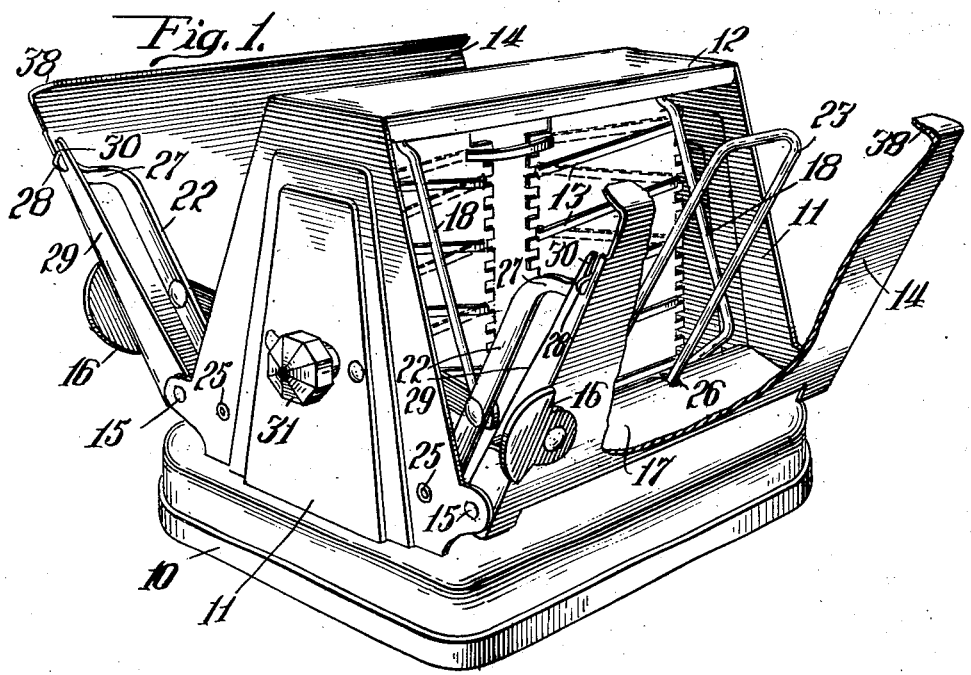
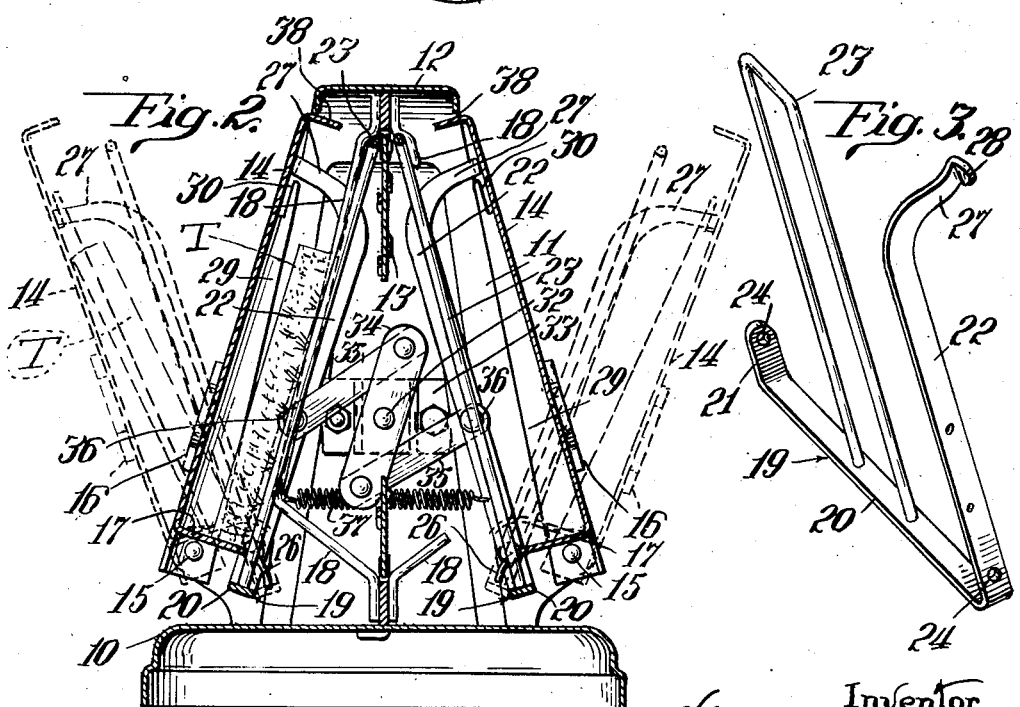
Inventor
Victor Emanuel,
By George Heideman
Attorney Patented Dec. 6, 1938

2,138,910

UNITED STATES PATENT OFFICE 2,138,910

TOASTER

Victor Emanuel, Chicago, Ill., assignor of one-half to Frank J. Cullomer, Chicago, Ill.

Application April 19, 1937, Serial No. 137,739

8 Claims. (Cl. 53—5)

My invention relates to a bread toaster of the downwardly swinging side wall type which are usually of double operation for simultaneously toasting two pieces of bread, although my improvement is not necessarily limited to that particular type.

The invention has for its object the provision of means whereby periodical inspection of the toasting side of the bread may be had without the need of touching or handling the hot bread or changing the position thereof before complete toasting of the invisible side of the bread has been accomplished.

The invention also has for its object the provision of means whereby the side walls or doors of the toaster may be opened sufficiently for the desired inspection without permitting the doors to drop down or open completely and allowing the insufficiently toasted bread to slide out of the toaster; my improved means being adapted to hold the side walls or doors in the partially open position and to also tilt the bread sufficiently to expose to view the sides of the pieces of bread which are being toasted and therefore disposed toward the heating element; said means also being adapted to automatically return the side walls or doors to closed position and return the pieces of bread into intimate relation with the heating element.

My invention also contemplates a construction wherein the doors or side walls of the toaster may be independently opened to complete open position without actuation of the controlling means heretofore referred to and therefore without actuation of the bread controlling element.

The objects and advantages of my invention will be readily comprehended from the detailed description of the accompanying drawing, wherein—

Figure 1 is a perspective view of my improved toaster with the side walls or doors arranged in toast inspecting position; one side wall or door being broken away to more clearly disclose the internal construction.

Figure 2 is a vertical sectional view looking toward the left hand end wall in Figure 1, with the heating element broken away and the doors or side walls shown closed in full lines while the inspection position of the side walls or doors and bread controlling grill element is shown in dotted lines.

Figure 3 is a detail perspective view of the door controlling and toast tipping means.

My invention relates to means whereby proper visibility or inspection of the respective pieces of bread, during toasting operation, may be had without a complete opening of the side walls or doors and hence an undesirable cooling of the heating element; the means at the same time being such that handling of the hot bread or toast during such inspection period is unnecessary and, therefore, the burning of fingers obviated.

In the particular exemplification a well known type of toaster is disclosed consisting of the base portion 10 and the upper or body portion consisting of the end walls 11, 11 made upwardly sloping or converging and connected by the top wall 12; a suitable heating element, generally indicated at 13, being arranged vertically between the top wall and the base in the usual manner. The two side walls 14, 14 constitute the doors and are pivotally secured at their bottoms at 15 so that the upper ends of the side walls may swing outwardly and downwardly; these side walls normally being permitted to drop downwardly into complete opening position. Each side wall 14 at one end is shown provided with a finger grasping portion 16 whereby independent manipulation of the side walls or doors 14 may be accomplished; the finger grasping portions 16 being of suitable non-heating material. The lower ends of the doors 14 are provided with the inwardly projecting base flange portions 17 on which the bread to be toasted rests.

These toasters are generally provided with some suitable vertically disposed wires or grills fixedly secured in place adjacent the heating element for supporting the bread in vertical position and in slight spaced relation with the heating element. In my improved toaster I provide certain fixedly secured grill elements at 18, 18 in Figure 1 adjacent opposite ends of the toaster.

It will be understood that similar grill elements are located on the opposite side of the toaster and that the door constructions on both sides of the toaster are identical.

With toasters as heretofore constructed, the pieces of bread were inserted to rest on the bottom flange 17 of each door and inclined against the fixed grill elements with the result that the side which was being toasted was invisible and its condition could not be ascertained without sufficiently opening the doors and then, either by finger or some other means, tilting the pieces of bread sufficiently away from the fixed grill elements to enable inspection; or by completely opening the doors to allow the bread to slide toasting side down onto the opened door and then turning the bread over. The inconvenience and possibility of burning the operators' fingers is apparent.

My invention is devised to overcome the difficulties mentioned and this is accomplished by providing the combination frame element indicated generally at 19 in Figure 3 consisting of the bottom horizontally disposed frame portion 20 having a short upturned portion 21 at one end and the long upstanding end or arm 22 at the other; while the intermediate part of the horizontally disposed frame portion 20 is provided with the grill element portion 23 shown in the nature of an inverted U-shape wire or rod fixedly secured at its ends to the base frame 20. A similar combination frame 19 is intended to be disposed along each side of the toaster with the base portions 20 arranged in a plane beneath the plane of the flanged portions 17 of the doors. The ends 21 and 22 are shown provided with suitable holes at 24, 24 to permit the combination frame to be pivotally secured to the ends 11 of the toaster, namely at the places indicated at 25 in Figure 1 so as to permit the combination frame to swing through a horizontally disposed arc in the manner shown in Figure 1. In order to permit such swinging movement, the bottom flanges 17 of the doors 14, at points coincident with the grill elements 23, are provided with slots as at 26 see Figure 1.

The upper ends of the arms 22 of each combination frame 19 are bent or offset laterally toward one side of the longitudinal axes of the arms as shown at 27 and the distal ends bent substantially at right angles to the portions 27 as shown at 28.

The side doors 14, 14 are provided with end flanges 29, preferably terminating a short distance from the tops of the doors and the upper ends of the flanges 29 are each provided with a vertical slot 30 adapted to receive the bent end 28 at the upper end of the arm 22, see Figure 1. The bent ends 27 with the tips 28 of the arms 22 are adapted to engage the respective side doors above the flanges 29 and to cause the side doors to tilt outwardly in advance of the tilting of the bread through movement of the grill element 23 in order to prevent the bread being pressed against the side doors.

One of the end walls 11 of the toaster is shown provided with a finger grasping knob 31 fixedly secured to a spindle 32 which extends through the end wall of the toaster, the inner end of the spindle being rotatably mounted in a suitable bracket 33 which is secured on the inner side of the end wall 11 of the casing as shown in Figure 2. The spindle 32 has a lever 34 fixedly secured thereto with the lever disposed equal distances to opposite sides of the spindle, see Figure 2; and each end of the lever 34 has a link 35, 35 pivotally secured thereto, while the other end of each link 35 is pivotally secured at 36 to the adjacent arm 22 of the combination frame 19. It is apparent from the construction as illustrated in Figure 2 that rotation of the knob 31 and spindle 32 in counterclockwise direction will cause the upper end of lever 34 to swing to the left in Figure 2 while the lower end thereof swings to the right thus causing the respective links to tilt both combination frames 19 outwardly which in turn brings the upper outer ends of the arms 22 against the inner sides of the doors immediately above the door side flanges 29 and causes the right angularly disposed ends 28, 28 of said arms to move downwardly into the slots 30 of the doors with the result that the doors will be controllably tilted into the position shown in full lines in Figure 1; further opening movement of the doors beyond the tilted position shown being prevented by the ends 28 engaging the bottoms of the slots 30.

During the tilting of the doors as just described, the grill elements 23 also have tilted as shown in Figure 1 and likewise have tilted the pieces of bread against the doors thereby permitting full view and inspection of the toasting sides of the pieces of bread.

If the side of the bread disposed toward the heating element is found to be sufficiently toasted, the knob 31 is released and the two combination frames 19 are drawn toward each other—namely back to normal position—and likewise both doors are also drawn back to closed position due to the interlocked or controlling relation between the frames 19 and the doors. This automatic return movement of the mechanism and doors is accomplished by a suitable spring as shown for example at 37.

The toasting position of the bread is indicated at T in Figure 2, while the inspection position is shown in dotted lines at the left in Figure 2. As stated, upon release of the knob 31 and the return of the doors to closed position, the grill elements 23 will return adjacent the heating element substantially in parallel relation with the permanently secured grill elements 18. The user than grasps the finger portion 16 on each door and opens the doors completely which causes the toast to fall against the doors by reason of the tilting door flange 17; the doors being allowed to drop down to a position where the tops of the doors will be disposed in planes slightly below the hinged ends; the toast being held from sliding off the doors by the top flanges 38. In the event of only one side of the pieces of bread having been toasted, the doors are than lifted by means of finger pieces 16, which will cause the pieces of bread to turn upwardly against the grill elements, thereby presenting the untoasted sides toward the heating element; inspection of the last mentioned side of the bread being obtained in the manner heretofore described.

The independent opening of the doors for insertion and removal of the bread or toast is possible because when the combination frames 19 are in normal position the distal ends or tips 28 will be positioned slightly above the door-flanges 29 and hence out of the slots 30 as shown in full lines in Figure 2.

The exemplification of the invention as disclosed in the drawing is believed to be the best embodiment thereof, but certain modifications may be made without, however, departing from the spirit of my invention.

What I claim is:

1. A toaster of the character described comprising side doors hingedly secured at their lower ends so their upper ends swing laterally outward, said doors being individually operable; and combined door and toast controlling mechanism operatively disposed between the doors and the heating element of the toaster whereby the doors may be partly opened, the doors locked in said partly opened position and the pieces of bread tilted outwardly against the doors to expose the toasting sides of the bread.

2. A toaster of the character described provided with a laterally swinging door having a slotted portion on its inner side and hingedly secured at its bottom and a vertically arranged heating element; combined door and toast controlling mechanism operatively disposed between the door and the heating element and involving a grill portion and an arm whereby the upper part of the door will be moved outwardly and a holding engagement with the slotted portion effected and the door thereby held partly open while the grill portion will cause the inserted piece of bread to be tilted to permit inspection of the toasting side thereof; means whereby said mechanism may be operated; and means whereby said mechanism with the door and the bread are automatically returned to normal position.

3. A toaster of the character described provided with a laterally swinging door hingedly secured at its bottom and with a vertically arranged heating element; combined door and toast controlling mechanism operatively disposed between the door and the heating element, a portion of said mechanism being adapted to effect interengaging sliding relation with the door whereby the door may be opened and locked in partly open position, while the other portion tilts the inserted bread simultaneously against the partly opened door to permit inspection of the toasting side thereof; means for actuating said mechanism; and means whereby the door may be independently opened for reversing and for removing the bread.

4. A toaster of the character described provided with laterally swinging doors on opposite sides of the toaster hingedly secured at their bottoms and with a vertically arranged heating element; combined door and toast controlling mechanisms operatively intermediate of the doors and the heating element, one portion of said mechanism being adapted to effect holding engagement with its adjacent door and the latter opened a predetermined degree, while the other portion tilts the bread against the partly opened door to permit inspection of the toasting side thereof; manually operated means for simultaneously actuating both of said mechanisms; and means for automatically returning said mechanisms with the partly opened doors to closed positions when said manually operated means is released.

5. A toaster of the character described provided at opposite sides with doors hingedly secured at their lower ends to swing laterally outward at their upper ends and having a vertically arranged heating element; mechanisms tiltably mounted intermediate the doors and the heating element, a portion of said mechanisms being disposed intermediate the bread and the heating element and adapted to tilt the bread outwardly against the doors, while the other portions of said mechanisms tilt the doors and effect a holding engagement with the doors; and means whereby both of said mechanisms will be simultaneously actuated; and means whereby the doors may be independently actuated.

6. In a toaster of the character described provided with a vertically disposed heating element and with doors, at opposite sides of the element, hinged at their lower ends to permit the upper ends to swing laterally outward while the upper ends of the doors are provided with vertically slotted portions; means pivotally mounted intermediate of the heating element and the lower ends of the doors and involving toast controlling grills arranged to tilt the toast outwardly toward the doors; and upstanding arms operatively connected with each grill to tilt therewith, each arm being adapted to effect interengaging relation with the slotted portions of the adjacent door during the initial tilting of the arm; and means whereby the grills and arms at opposite sides of the heating element are simultaneously actuated; and means whereby each door may be independently actuated.

7. In a toaster of the character described provided with a vertically disposed heating element and downwardly swinging doors on opposite sides; a toast controlling grill located on each side of the heating element and pivotally mounted at the lower end to tilt laterally toward the adjacent door; a vertically disposed arm on each side of the heating element and operatively connected at the lower end to the adjacent grill so as to tilt therewith, the upper end of each arm being formed to effect controlling relation with the adjacent door to hold the latter in predetermined open position; means common to the grills and arms on opposite sides of the heating element for simultaneously tilting the grills and arms; and means whereby the doors may be independently operated.

8. In a toaster of the character described provided with a heating element and downwardly swinging doors on opposite sides; a grill and arm carrying frame tiltably mounted between the heating element and each door, the grill being adapted to tilt the toast toward the door away from the heating element while the arm is adapted to effect a finger-and-slot relation with the adjacent door during the initial tilting of the frame; finger operated means whereby both frames may be simultaneously tilted; and means whereby the frames with grills and arms will automatically be returned to normal position.

VICTOR EMANUEL.